June 16, 1959   S. B. VALIULIS   2,890,733
SCREW-HOLDING SCREW DRIVER
Filed May 15, 1956
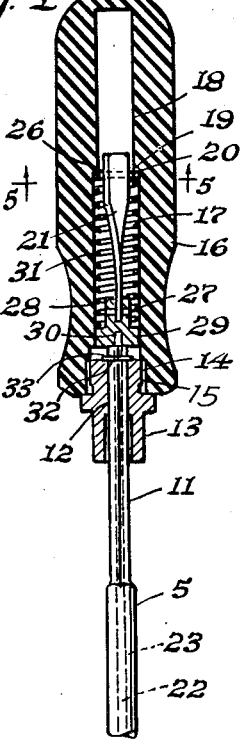
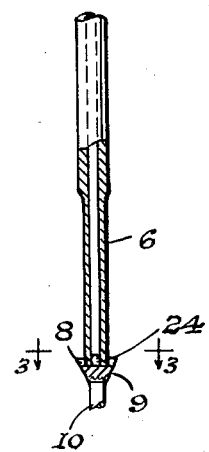
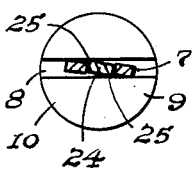
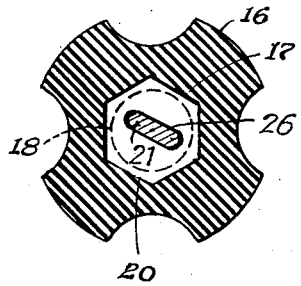
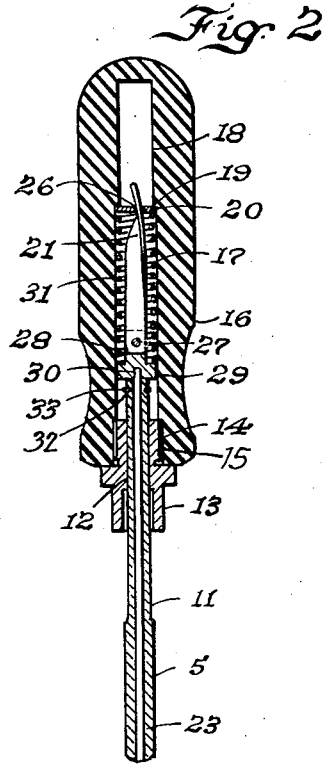
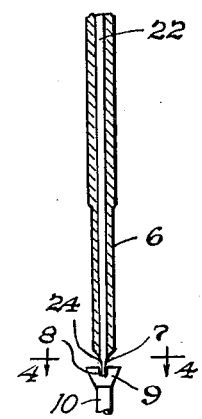
Inventor
Stanley B. Valiulis
Atty

United States Patent Office 2,890,733
Patented June 16, 1959

2,890,733

SCREW-HOLDING SCREW DRIVER

Stanley B. Valiulis, Rockford, Ill.

Application May 15, 1956, Serial No. 584,917

1 Claim. (Cl. 145—50)

This invention relates to a new and improved screw-holding screw driver.

The principal object of my invention is to provide an improved screw driver of the kind mentioned in which endwise movement of the handle relative to the outer end portion of the tubular shank causes slight turning of a screw-gripping center stem before the screw driver is turned to drive the screw, the center stem having a tapered end portion that is normally aligned with the tapered end of the shank but when turned slightly with respect to it in the screw slot takes a good hold and prevents slipping.

In accordance with my invention, the handle is held against turning with respect to but slidable on the outer end portion of the tubular shank to provide a driving connection and yet permit the endwise movement of the handle with respect to the shank required for transmitting rotation to the center stem, and a coiled compression spring is housed in preloaded condition in the handle and is compressed further in the movement of the handle to apply endwise pressure jointly to the shank and center stem and to the same extent. In the endwise movement of the handle with respect to the rest of the assembly, a helix member attached to one end of the center stem is turned by axial movement relative to a slotted washer fixed in the handle and turns the stem to exert a spring loaded semi-positive gripping action on the screw head while the screw driver is pressed into the screw slot as a result of the compression of the spring incident to the rotation of the helix member.

The invention is illustrated in the accompanying drawing, in which—

Fig. 1 is a view partly in side elevation and partly in longitudinal section of a screw driver made in accordance with my invention and shown engaged in the slot in the head of a screw;

Fig. 2 is a similar section showing the screw driver turned through about 90° and with the handle moved endwise so as to turn the helix member for the screw-gripping action;

Figs. 3 and 4 are enlarged sections on the correspondingly numbered lines of Figs. 1 and 2 to better illustrate the operation of this screw driver, and Fig. 5 is a cross-section on the line 5—5 of Fig. 1.

The same reference numerals are applied to corresponding parts throughout these views.

Referring to the drawing, the reference numeral 5 designates the tubular shank of the screw driver, one end portion 6 of which is of reduced diameter and terminates in a tapered point 7 for engagement in the usual slot 8 in the head 9 of a screw 10. The other end portion 11 of the shank 5 is given a hexagonal form for a slidable driving fit in the hexagonal bore 12 in a metallic bushing 13 that has a knurled or serrated reduced end portion 14 entered with a press fit at 15 in one end of a hollow molded plastic handle 16. The latter has a longitudinal bore 17 of hexagonal form provided therein ending in a cylindrical bore 18 which is of slightly smaller diameter so as to define therebetween an annular shoulder 19 for support of a hexagonal washer 20 that is pressed all the way in in bore 17 to anchor the same securely in place and against turning. This washer is relied upon to turn the helically bent sheet metal strip 21 and thereby turn the stem 22 that extends through the bore 23 of the shank 5 for connection with the screw head 9, the extremity of the rod 22 being tapered to match the taper 7 on the point of the shank 5, as indicated at 24, so as to enter the slot 8 in the screw head freely with the point 7 but being wider than the slot 8, as appears in Figs. 3 and 4, to take hold on opposite sides of the slot, as indicated at 25 in Fig. 4, when the stem 22 is turned with respect to the shank 5. The washer 19 has a diametrically extending slot 26 provided therein in which one end of the helix member 21 has a slidable driving connection so as to be turned relative to the handle 16 upon endwise movement of the handle relative to the helix member. The other end of the helix member is connected by means of a pin 27 in a clevis 28 provided on a collar 29 that has the outer extremity of the stem 22 drivingly connected therewith in an axial bore 30. A coiled compression spring 31 surrounds the helix member 21 and is compressed between the washer 20 and collar 29, the latter engaging the adjacent end of the hexagonal end portion 11 of the tubular shank 5. The latter has an annular groove 32 provided therein in which a split snap-ring 33 is entered to provide an annular shoulder to limit outward movement of the shank 5 relative to the handle, as appears in Fig. 1.

In operation, the parts are normally disposed in the relationship shown in Fig. 1. The tapered end 24 of stem 22 is ground to the tapered form shown with the tapered end 7 of the shank 5 to form in effect a single wedge blade or point on the end of the screw driver for engagement in the slot 8. After the point 7 is entered in the slot 8 the operator moves the handle 16 inwardly a fraction of an inch to cock the end 24 of the stem 22 with respect to the point 7 of the screw driver, as shown in Fig. 4, to take a good hold on opposite sides of the slot, as at 25. Then the screw can be turned in either direction by a corresponding turn of the handle 16 to loosen or tighten the screw, and by virtue of the gripping action at 24—25 there is no danger of the screw driver slipping. The small diameter of the stem 22 and its appreciable length (approximately 12 inches in one case), accounts for the semi-positive gripping action obtained, because the stem itself is twistable to an appreciable extent thus giving a desirable amount of resilience to the operation, while the drive transmitted by washer 20 to helix member 21 in the endwise movement of the handle 16 is substantially positive. The spring 31, which is pre-loaded, is loaded further in this endwise movement of the handle 16 just mentioned, and, as appears in Fig. 2, the spring loading is applied jointly to the point 7 of the shank 5 and the pointed end 24 of the stem 22 so that the operator always has a good feel of the operation in loosening or tightening a screw, and there is far less danger of slippage than where ordinary screw drivers are used in a similar situation. There is obviously nothing to get out of order in the present screw driver and in the event the points 7 and 24 become rough and worn, the operator can easily grind the tool to reproduce substantially the original form on the end, and hence the present tool will last indefinitely.

It is believed the foregoing description conveys a good understanding of the objects and advantages of my invention. The appended claim has been drawn to cover all legitimate modifications and adaptations.

I claim:

In combination in a screw driver, a shank having a longitudinal bore and having one end portion tapered for entry in the slot in the head of a screw, a handle having a longitudinal bore provided therein, a brushing fixed in the outer end of said handle bore and having a longitudinal bore of hexagonal shape in cross section, a stem rotatable in the bore in said shank and having an outer end portion thereof coterminal with and tapered to match the taper on the corresponding end of said shank, the other end of the shank having a portion of hexagonal shape in cross section disposed within and closely fitting the bushing bore to provide a sliding non-rotative driving fit between the handle and the shank, the tapered end of said stem being appreciably wider than the slot in the head of the screw whereby to exert a gripping action at diagonally opposed points thereof in said slot when turned relative to said shank, a collar fixed on an inner end portion of said stem inside said handle and rotatable in the bore therein, a washer non-rotatably mounted in said handle bore in spaced relation to said collar and having a diametrically extending slot provided therein, an elongated helix member disposed wholly within the handle bore and having one end secured to said collar and its other end engaging the washer slot and longitudinally slidable therethrough, a coiled compression spring surrounding the helix and having one end in engagement with the collar and its other end in engagement with the washer, said spring being normally under compression and resiliently holding the handle and shank against longitudinal movement in respect to one another and the tapered end of the shank and the tapered end of the stem in alignment with one another, and the handle being slidable inwardly on the shank against the tension of the coil spring to rotate the stem in respect to the shank to position the tapered end of the stem at an angle to the tapered end of the shank, as described.

References Cited in the file of this patent

UNITED STATES PATENTS

| | | |
|---|---|---|
| 1,271,816 | White | July 9, 1918 |
| 2,161,095 | Schaffer | June 6, 1939 |
| 2,324,153 | Hagness | July 13, 1943 |

FOREIGN PATENTS

| | | |
|---|---|---|
| 197,371 | Switzerland | Aug. 1, 1938 |
| 297,517 | Switzerland | June 1, 1954 |